(12) United States Patent
Choi et al.

(10) Patent No.: US 7,244,511 B2
(45) Date of Patent: Jul. 17, 2007

(54) COLOR STEEL SHEET WITH EMBOSSED PATTERNS ON ONE SIDE THEREOF

(75) Inventors: Jang Hyun Choi, Busan (KR); Sung Su Jun, Busan (KR); Sang Hoon Park, Busan (KR); Won Young Lee, Busan (KR); Byung Hak Lee, Busan (KR)

(73) Assignee: Union Steel Manufacturing Co., Ltd., Busan (KR)

( * ) Notice: Subject to any disclaimer, the term of this patent is extended or adjusted under 35 U.S.C. 154(b) by 0 days.

(21) Appl. No.: 11/325,828

(22) Filed: Jan. 4, 2006

(65) Prior Publication Data

US 2006/0147745 A1 Jul. 6, 2006

(30) Foreign Application Priority Data

Jan. 5, 2005 (KR) .................. 10-2005-0000858

(51) Int. Cl.
*B33B 15/04* (2006.01)
*B33B 15/08* (2006.01)
*B33B 15/09* (2006.01)
*B33B 15/18* (2006.01)

(52) U.S. Cl. .................. 428/601; 428/659; 428/684; 428/626; 428/458; 428/332

(58) Field of Classification Search ............ 428/601, 428/659, 681, 684, 626, 220, 332, 457, 458, 428/469, 472, 542.2
See application file for complete search history.

(56) References Cited

U.S. PATENT DOCUMENTS 2,850,999 A 9/1958 Kaplan et al.

2004/0058187 A1* 3/2004 Choi et al. ............ 428/626
2005/0019600 A1* 1/2005 Choi et al. ............ 428/626

FOREIGN PATENT DOCUMENTS

| KR | 10-0197932 | 6/1999 |
|---|---|---|
| KR | 2000-038815 | 7/2000 |
| KR | 2002-091603 | 12/2002 |
| KR | 10-0442192 | 7/2004 |
| KR | 2004-107550 | 12/2004 |

* cited by examiner

*Primary Examiner*—Michael E. LaVilla
(74) *Attorney, Agent, or Firm*—Thelen, Reid, Brown, Raysman & Steiner

(57) ABSTRACT

A single-side embossed color steel sheet, and a method for manufacturing the same are disclosed. The steel sheet comprises a steel sheet substrate, a zinc or zinc alloy-plated layer, a non-chromate or chromate pretreated layer, a primary coat paint layer of modified epoxy or modified polyester, a color base paint layer, a printed layer, and a top coat clear paint layer. The printed layer exhibits a feeling of solidity with various feelings of texture and colors. The top coat clear paint layer serves to protect the printed layer from contaminants. The color steel sheet exhibits a remarkably enhanced feeling of solidity at an irregular surface thereof, and has enhanced contaminant resistance properties and environmental friendliness, thereby satisfying requirements for aesthetic design and functionality of products.

5 Claims, 5 Drawing Sheets

COLOR STEEL SHEET WITH EMBOSSED PATTERNS ON ONE SIDE THEREOF

BACKGROUND OF THE INVENTION

1. Field of the Invention

The present invention generally relates to a single-side embossed color steel sheet having printability, and, more particular, to a single-side embossed color steel sheet, which is produced via a process of printing on an embossed side of the steel sheet to exhibit various feelings of texture and colors so that an irregular surface of the steel sheet exhibits a remarkable feeling of solidity, and has enhanced contaminant resistance properties and environmental friendliness, thereby satisfying demands of functionality and aesthetic design at the same time.

2. Description of the Related Art

Recently, in a market of household appliances, consumers regard an aesthetic design as one of the most important choice criteria as well as basic functionality when choosing the household appliances, and thus manufacturers also try to satisfy such demands of the consumers via diversification of aesthetic design, a feeling of texture or a feeling of color of products, and via development of high quality products. In addition to the fundamental function and the diversification of the aesthetic design, the manufactures are also confronted with a difficulty in that it is necessary to produce environmentally friendly products using harmless materials in preparation for tough environmental regulations which will likely be adopted in many countries around the world.

Conventional color steel sheets with an embossed surface include a single-side embossed steel sheet, and a double-side embossed steel sheet which has a similar appearance to the single-side embossed steel sheet. The single-side embossed steel sheet is manufactured by the steps of compressing one side of a steel sheet with a metal roller (emboss roller) having a predetermined pattern formed thereon upon skin-pass rolling of cold rolling to form an embossed pattern on the one side of the steel sheet, performing electro plating or hot-dip plating on the embossed side to form a galvanized coating or other well-known coatings, performing a general pre-treatment including a chromic acid treatment, and spray printing in a sheet manner. The double-side embossed steel sheet is produced by the steps of printing a steel sheet using paints for pre-coated metal (PCM), and compressing the painted steel sheet with a double-side embossing rollers.

One of the conventional techniques is disclosed in Korean Patent No. 197932, entitled "Color steel sheet with one side embossed, and method thereof." This patent addresses problems related to defective coat adherence caused on the surface of both sides of crease of an irregular portion, pores/bubbles around an embossed portion of a single-side embossed steel sheet which will be subjected to a PCM painting treatment, and defects caused by the irregularity on the steel sheet. In this regard, this patent solves these problems by developing a new plating technique and paints, and specifically, improves treatment conditions and a method thereof. However, this patent has a disadvantage in that, since a resin (in particular, a top coat) of the disclosure causes a color difference (non-uniform covering power) at an angled portion with surface irregularity formed thereon, and is poor in deep drawability, thereby failing to obtain steel sheets having optimal properties. Furthermore, it also has a disadvantage in that since the surface appearance also depends only on an embossed irregular pattern, the steel sheet has a simple appearance.

Another conventional technique is disclosed in Korean Patent No. 442192, entitled "Color steel sheet with one side embossed." The single side embossed color steel sheet of the disclosure is formed by the steps of forming a well-known chromate layer on one embossed side of a steel sheet, forming a polyester primary coat of a high workability on the chromate layer, and forming a top coat using a polyester resin as a primary resin in addition of other resins. This patent solves a problem of environmental contamination caused by a conventional plating process while providing a natural appearance to the steel sheet by forming irregularity or corrugation on the surface of the steel sheet. However, since such irregularity or corrugation on the surface of the steel sheet can be expressed only in a single color, the steel sheet provides a monotonous feeling of color, thereby failing to satisfy demands of the consumers. Furthermore, since the steel sheet is manufactured by use of some detrimental materials whose use must be suppressed in terms of environmental regulations, the steel sheet of the disclosure does not satisfy requirements for environmental friendliness from around the world.

In terms of a plating method for producing a PCM color steel sheet, although two-roll natural type or two-roll reverse type roll coating method has been applied to a construction material which does not have a significant emphasis on an appearance, this method is difficult to precisely adjust a paint thickness, and is likely to suffer from popping and roll marks.

Accordingly, although a three-roll reverse type coating method overcoming such a problem as mentioned above has been typically applied to a color steel sheet for household appliances which have an emphasis on their appearance, this method also has problems in that it is difficult to freely control a paint thickness due to irregularity of the surface which is a property of an embossed substrate, and in that a manufacturing speed is lowered.

SUMMARY OF THE INVENTION

The present invention has been made to solve the above problems, and it is an object of the present invention to provide an environmentally friendly single-side embossed color steel sheet, which is produced via a process of printing on an embossed side of a color steel sheet to exhibit various feelings of texture and color while providing an optimal appearance with a feeling of solidity and a specific feature, and a method for manufacturing the same.

In addition, it is another object of the present invention to provide the single-side embossed color steel sheet, which has paint covering properties at irregular portions on the surface, and has a paint layer with sufficient feelings of texture by enhancing a conventional roll coating method, so that the steel sheet has an embossed appearance with an excellent feelings of texture and color.

In accordance with one aspect of the present invention, the above and other objects can be accomplished by the provision of a single-side embossed color steel sheet, comprising: a steel sheet substrate; a zinc or zinc alloy-plated layer; a non-chromate or chromate pretreated layer; a primary coat paint layer comprising an oil-free polyester, polyisocyanate, epoxy, pigment, additives and solvents, the oil-free polyester having a number-average molecular weight of 15,000~25,000, a glass transition temperature (Tg) of 10~30° C. and an OH value of 5~20; a color base paint layer comprising a modified oil-free polyester compound, pigment, additive, and solvent, the modified oil-free polyester compound being formed by reacting melamine with an oil-free polyester having a number-average molecular weight of 8,000~20,000, a glass transition temperature (Tg) of 20~45° C. and an OH value of 15~40; a printed layer; and a top coat clear paint layer.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Figure 1:
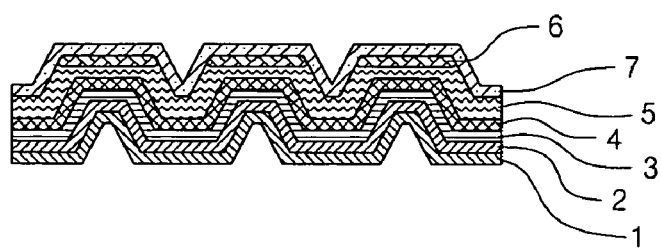
FIG. 1 is a cross-sectional view illustrating a single-side embossed color steel sheet in accordance with the present invention.

Preferred embodiments will now be described in detail with reference to the accompanying drawings.

A single-side embossed color steel sheet of the invention comprises a steel sheet substrate 1; a zinc or zinc alloy-plated layer 2; a non-chromate or chromate pretreated layer 3; a primary coat paint layer 4 comprising an oil-free polyester, polyisocyanate, epoxy, pigment, additives and solvents, the oil-free polyester having a number-average molecular weight of 15,000~25,000, a glass transition temperature (Tg) of 10~30° C. and an OH value of 5~20; a color base paint layer 5 comprising a modified oil-free polyester compound, pigment, additive, and solvent, the modified oil-free polyester compound being formed by reacting melamine with an oil-free polyester having a number-average molecular weight of 8,000~20,000, a glass transition temperature (Tg) of 20~45° C. and an OH value of 15~40; a printed layer 6; and a top coat clear paint layer 7.

A main resin of the paints used for the base paint layer and the clear paint layer comprises a modified oil-free polyester compound formed by reacting the oil-free polyester with melamine having excellent workability, in which the oil-free polyester has a number-average molecular weight of 8,000~20,000, a glass transition temperature (Tg) of 20~45° C., and an OH value of 15~40.

In addition, the single-side embossed color steel sheet of the invention comprises the non-chromate pretreated layer, base paints, and a primary coat paint layer, which do not contain materials (such as $Cr^{6+}$, Pb, Cd, etc.) which are under environmental regulation.

Although any kinds of well-known ink for PCM is available for a print ink constituting the printed layer, printability on an embossed irregular surface, and popping resistance at an interface between the printed layer and the other layer must be considered when adopting the print ink for the printed layer.

As for the plated steel sheet substrate 1, any kinds of well-known plated steel sheet, such as zinc-aluminum-silica alloy plated steel sheets and electro plated or hot-dip galvanized steel sheets, are available. In addition, copper sheets, aluminum sheets, and stainless steel are also available.

The non-chromate layer 3 is provided to enhance corrosion resistance of the steel sheet, as well as adherence of primer paints, and the like. As for the non-chromate layer 3, a coat type non-chromate layer is preferably used in terms of environmental friendliness. However, since the coat type non-chromate layer is slightly lower in corrosion resistance than a conventional chromate coat, it is possible to use a pretreatment agent of chromate or $Cr^{3+}$, if necessary.

According to the invention, the clear paints constituting the uppermost paint layer 7 of the color steel sheet are PCM paints which exhibit a good feeling of texture and excellent contaminant resistance on the surface of the painted layer. The clear paints of the invention basically comprise a polyester resin designed to maintain an excellent gasket property and PE bag erodibility, and a melamine resin having excellent workability to form a dense paint layer, thereby having good contaminant resistance and corrosion resistance. In order to provide such properties to the top coat clear paint layer 7, the clear paints comprises p-toluene sulfonic acid (PTSA), which is a low temperature curing accelerator as a necessary component, and an increased content of methoxy or methoxy-butoxy partially substituted melamine.

The clear paint layer will be described in detail as follows.

A resin for PCM paints (regular polyester) is generally used for construction materials, and has a structure that functional groups such as a hydroxyl group, a carboxyl group, and the like are branched from the backbone of the resin. Thus, when forming a crosslink together with a melamine resin (for example, Hexa-Methoxymethyl melamine), it has a network structure, so that, when forming a paint layer, it exhibits a very limited elongation. On the contrary, a polyester resin for flexible polyester paints is generally used for household appliances, and has a structure such that the backbone of the resin is linear. Thus, although the paint layer of this resin has an excellent elongation, it has disadvantages in view of corrosion resistance and contaminant resistance.

Thus, in order to provide excellent contaminant resistance to the main polyester resin of the clear paints with reference to its glass transition temperature (Tg) of 55~65° C. as well as physical properties such as flexibility of the paint layer and the like which are generally required for household appliances, the main polyester resin is preferably a modified oil-free polyester compound formed by reacting oil-free polyester with melamine having excellent workability, in which the oil-free polyester has a number-average molecular weight of 8,000~20,000, a glass transition temperature (Tg) of 20~45□, and an OH value of 15~40.

As for the melamine used for a crosslink resin, a highly alkylated hexa methoxy methyl melamine having a number-average molecular weight of 300~1,000, and a partially alkylated methoxy-butoxy melamine are preferable.

If butoxy melamine is solely used or a mixture of the methoxy melamine and butoxy melamine is used, a mixing property with polyester is severely deteriorated, and melamine is moved towards an upper portion of the paints, thereby causing defects such as roll marks.

As for melamine of the clear paints, RESIMINE 755 available from SOLUTIA Co., RESIMINE 757 available from SOLUTIA, RESIMINE 751 available from SOLUTIA Co., CYMEL 1168 available from CYTEL Co., CYMEL 1170 available from CYTEL Co., CYMEL 232 available from CYTEL Co. can be used.

The curing accelerator of the clear paints servers to enhance the contaminant resistance and the density of the paint layer by accelerating crosslinking between polyester as the main resin and melamine as the crosslink resin. The curing accelerator comprises p-toluene sulfonic acid, dinonylnaphthalene sulfonic acid, DDBSA, dodesyl benzene sulfonic acid, and the like, which are acids blocked and masked with amine.

In addition, the curing accelerator may comprise epoxy masking sulfonic acid or organic resin masking sulfonic acid. More preferably, the curing accelerator comprises PTSA which has a high degree of dissociation at low temperature in order to provide the maximum density to the paint layer within a preset short period of time.

The solvents of the upper clear paint layer are selected from hydrocarbon based solvents, ester based solvents, and ether based solvents in consideration of popping resistance related to a print ink paint layer, permeation of the ink paint layer, and prevention of roll marks in addition to popping resistance on an embossed irregular surface of the steel sheet.

The paints of the color base paint layer will be described hereinafter.

The paints of the color base paint layer may comprise a resin of top clear paints as a base resin, and DNNSA (dinonylnaphthalene sulfonic acid) as a curing accelerator with reference to a glass transition temperature (Tg) of 50~55° C. in consideration of adherence between the clear paints of top and primary coats, and adherence with the print ink. In addition, the color base paint may comprise additives and solvents similar to other paints under the conditions wherein the amounts of additives and solvents are appropriately adjusted.

As for the pigment, organic or inorganic pigments for PCM paints can be used without limitation. In this regard, although the pigment of the invention does not contain materials under environmental regulation, these materials may also be used, if necessary.

It is desirable that the paints of the clear and base layer may have a composition ratio as follows.

TABLE 1

| Content | Composition | Clear paints | Base paints |
|---------|-------------|--------------|-------------|
|         |             | Amounts (wt %) | |
| Resin | Polyester resin | 30–45 | 25–40 |
|       | Melamine resin | 5–15 | 4–10 |
| Pigment | Organic pigment | 0 | 2–5 |
|         | Inorganic pigment | 0 | 5–35 |
| Additive | Deforming agent | 0.1–1.0 | 0.1–1.0 |
|          | Leveling agent | 0.1–1.0 | 0.1–1.0 |
|          | Curing accelerator | 0.5–2.0 | 0.5–2.0 |
|          | Color separation inhibitor | 0 | 1–3 |
|          | Blocking inhibitor | 0.1–1.0 | 0.1–0.5 |
|          | Thixotropic agent | 0 | 0.1–1.0 |
| Solvents | Hydrocarbon-based | 10–20 | 10–20 |
|          | Ester-based solvents | 10–20 | 10–20 |
|          | Ether-based solvents | 10–20 | 10–20 |
|          | Acetate-based solvents | 10–20 | 10–20 |
|          | Others | 1–5 | 1–5 |

The primary coat will be described hereinafter.

The primary coat is used for adherence of a material. As for the primary coat, polyester-based primary coat, epoxy-based primary coat, acryl-based primary coat, acryl-based primer, or modified acryl-based primary coat may be used. The main resin and the crosslink resin of the primary coat must be selected in consideration of adherence with the substrate and the base paint layer, popping resistance of the paint layer, build-up of paints at irregular portions, workability, formability, corrosion resistance, chemical resistance, and the like. In this regard, as for the main resin, oil-free polyester which has a number-average molecular weight of 15,000~25,000, a glass transition temperature (Tg) of 10~30° C., and an OH value of 5~20 may be used. In addition, as for the crosslink resin, polyisocyanate for enhancing the build-up of the paints and the popping resistance, and epoxy for enhancing the corrosion resistance and adherence may be used.

Polyisocyanate partially reacts with OH-groups which are branched from the backbone of polyester (that is, urethane coupling), and serves to enhances the properties of the resin, such as build-up of the paints, the popping resistance, the corrosion resistance, the workability, and the like.

As available isocyanate compounds, there are hexamethylene diisocyanate, isophorone diisocyanate, xylene diisocyanate, 2,4,6-triisocyanatetoluene, and other isocyanate compounds having the properties similar to these compounds. In particular, it is desirable to use isocyanate compounds which are masked with isocyanate, and dissociated by heat.

As for the epoxy, bisphenol-A (BPA) is preferable in terms of corrosion resistance, compatibility with resins, and adherence. Since modified BPA has a lower compatibility with the polyester resin, it is limited in use.

The epoxy may be YD-011, 128 available from Kukdo Chemical Co. in Seoul, Korea, EPICOAT 828, 1001 available from Kumho Co. in Seoul, Korea.

The curing accelerator of the primary coat serves to accelerate formation of crosslinks of the polyester resin as the main resin and the melamine resin as the crosslink resin, thereby enhancing adherence with respect the substrate and the paint layer. The curing accelerator comprises p-toluene sulfonic acid, dinonylnaphthalene sulfonic acid, DDBSA, dodesyl benzene sulfonic acid, and the like, which are acids blocked and masked with amine. In addition, the curing accelerator may comprise epoxy masking sulfonic acid or organic resin masking sulfonic acid.

The solvents of the primary coat are selected from hydrocarbon based solvents, ester based solvents, and ether based solvents in consideration of popping resistance and the build-up of paints on the embossed irregular surface.

At this time, in order to enhance roll-pick up properties together with popping resistance and the build-up of paints on the embossed irregular surface, the primary coat comprises a small amount of amorphous silica, and as for the amorphous silica, syloid #161 available from Grace Division Co. may be suggested.

In addition to enhancement in corrosion resistance and adherence between the substrate and the paint layer as fundamental properties, the primary coat has a high enhanced elongation ratio, and acts as a satisfactory buffering layer between the substrate and the upper paint layer, so that the primary coat absorbs cracks of the steel sheet occurring during machining of the steel sheet so as not to allow the cracks to progress to the upper layers.

As for the primary coat, a rust resistant pigment must be used. In this regard, it is preferable to use non-toxic rust resistant pigments which do not contain Pb or Cr in order to meet the environmental regulations adopted in many countries around the world. However, it is possible to use any of the conventional rust resistant pigments, if necessary.

The conventional rust resistant pigments include, for example, red lead containing Pb and Cr, zinc potassium chromate, zinc tetra chromate, strontium chromate. The non-toxic rust resistant pigments include barium meta-borate as a borate-based pigment, zinc molybdate and calcium zinc molybdate as a molybdate-based pigment, zinc phosphate and aluminum tri-phosphate as a phosphate-based pigment, calcium borosilicate, phosphor silicate, calcium ion-exchanged silicate, and magnesium ion-exchanged silicate as a silicate-based pigment calcium borosilicate, and the like.

It is desirable that the primary coat of the invention may have a composition ratio shown in the following table.

TABLE 2

| Content | Composition | Amount (wt %) |
|---|---|---|
| Resin | Polyester resin | 20–30 |
| | Polyisocyanate resin | 2–10 |
| | Epoxy resin | 2–6 |
| Pigment | Rust resistance pigment | 1–10 |
| | Color pigment | 20–40 |
| Additive | Deforming agent | 0.1–1.0 |
| | Leveling agent | 0.1–1.0 |
| | Curing accelerator | 0.5–2.0 |
| | Color separation inhibitor | 0 |
| | Blocking inhibitor | 0.1–1.0 |
| | Thixotropic agent | 0.1–1.0 |
| Solvents | Hydrocarbon-based solvents | 15–25 |
| | Ester-based solvents | 5–20 |
| | Ether-based solvents | 1–10 |
| | Acetate-based solvents | 1–10 |
| | Others | 1–5 |

A print ink for PCM which has an important role in terms of aesthetic design of the invention will be described hereinafter. Although any kinds of typical PCM print ink can be applicable, it is necessary for the print ink used for the single side embossed steel sheet to have printability and popping resistance at the irregular surface in addition to rapid drying properties and adherence to the top and primary coats which are properties of general inks.

In this regard, among pigments for the print ink, a metallic pigment preferably has a particle size of 60 μm or less. When using the pigment of the size exceeding 60 μm, particles can protrude from the surface, causing distinctness of an image on the surface to be deteriorated while generating defective prints at an interface between meshes. In addition, it causes defective painting since the pigment is held between the rollers when roll coating the clear paints on the printed layer.

By applying the print ink with such properties as described above to the continuous process of manufacturing the color steel sheet of the invention, it is possible to exhibit various feelings of texture and color in addition to the feeling of solidity caused by an irregularity of the embossed substrate, thereby reducing differences in color (covering force) at the non-uniform irregular portions on the surface of the steel sheet. As a result, it is possible to provide an environmentally friendly single-side embossed color steel sheet, which has an optimal appearance with the feeling of solidity and the specific feature.

In FIG. 1, a cross-section of the color steel sheet in accordance with the present invention is shown.

A method for manufacturing the single-side embossed color steel sheet of the invention will be described as follows.

The method for manufacturing the single-side embossed color steel sheet comprises the steps of: forming a zinc or zinc alloy-plated layer on a well-known steel sheet substrate 1 via electro plating or hot-dip plating, the steel sheet substrate 1 being embossed only on one side thereof; forming a pretreated layer 3 on the plated layer by applying non-chromate or chromate thereto at a line speed of 20~80 m/min, followed by drying a non-chromate or chromate layer at a temperature of 50~150° C.; forming a primary coat paint layer 4 on the pretreated layer 3, the primary coat paint layer 4 comprising an oil-free polyester, polyisocyanate, epoxy, pigment, additives and solvents, the oil-free polyester having a number-average molecular weight of 15,000~25,000, a glass transition temperature (Tg) of 10~30° C. and an OH value of 5~20; forming a top coat paint layer 5 by coating a top coat paint comprising a modified oil-free polyester compound, a curing accelerator, additives and solvents, followed by heating and drying the top coat paint at a peak metal temperature (PMT) of 190~240° C., the modified oil-free polyester compound being formed by reacting melamine with an oil-free polyester having a number-average molecular weight of 8,000~20,000, a glass transition temperature (Tg) of 20~45° C. and an OH value of 15~40; forming a printed layer 6; and forming a top coat clear paint layer.

Figure 2:
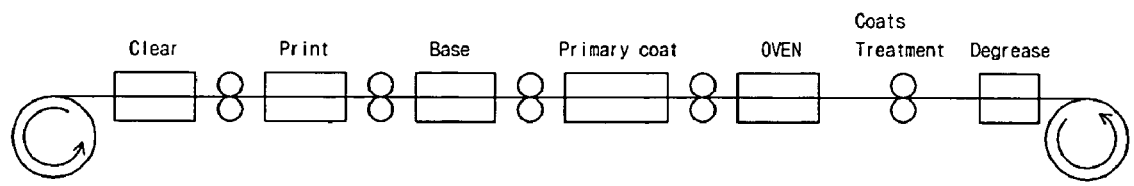
FIG. 2 is a flow diagram illustrating a method for manufacturing the single-side embossed color steel sheet in accordance with the present invention.

The steps of the method are detailed in FIG. 2.

When manufacturing the color steel sheet, the substrate of the one-side embossed steel sheet has an embossed pattern on one side thereof, which is formed by skin-pass rolling of a cold rolled steel sheet with a pair of skin-pass rollers after annealing. At this time, only one of the skin pass rollers has an embossed pattern, and the embossed roller is positioned at any one of upper or lower ends of a rolling machine. After skin pass rolling, the embossed steel sheet is degreased, and subjected to electro-plating or hot-dip plating to form a galvanized steel sheet according to utility of the steel sheet. In this regard, it should be noted that the present invention is not limited to the well-known process of plating after skin-pass rolling of the substrate as described above. Thus, it is possible to use a steel sheet substrate which is formed by rapid rolling of a previously plated steel sheet in order to reduce the number of steps and to meet rapid demand of the consumers.

In addition to the plated substrate, a typically cold-rolled steel sheet, a copper plate or a stainless steel may be used as the substrate of the invention.

Then, a non-chromate layer is formed on the substrate by depositing a non-chromate or chromate in a thin film thereon by a roll coating method at a line speed of 20~80 m/min, and drying the non-chromate or chromate film at a temperature of 50~150° C. Next, an environmentally friendly polyester primary coat, and a color polyester-based base are formed on the non-chromate layer.

Then, in the continuous process, the printing step is performed on the color base layer in order to provide further enhanced aesthetic design of the steel sheet of the invention.

As a printing roller used for this step, a mesh roller capable of overall surface printing can be used in addition to various pattern rollers. The mesh roller is a 100~200 mesh type roller since a 100 mesh or lower type roller lowers ink drying properties and a 200 mesh or more type roller deteriorates printability due to the rapid drying properties of the ink. Preferably, a 130~170 mesh type roller is used on the substrate in view of workability, printability, and rapid drying properties.

A printing degree of 1~4 can be suitably applied according to design patterns and colors.

For dried film thicknesses (DFT) of respective paint layers of the color steel sheet of the present invention, preferably, the top coat clear paint layer has a DFT of 5~20 μm, the printed ink layer has a DFT of 1~3 μm, the base paint layer has a DFT of 10~20 μm, the primary coat paint layer has a DFT of 4~10 μm, the non-chromate layer has a DFT of 100~250 mg/m² (chromate layer has a DFT of 20~80 mg/m$^2$), and the plated layer has a DFT of 15~23 mg/m$^2$. If the top coat clear paint layer has a DFT less than 5 μm, there is a deterioration in workability and brilliance of the steel sheet, and the surface thereof suffers from defects due to contaminants. If the top coat clear paint layer has a DFT greater than 20 μm, the hardness of the paint layer is lowered, and it is disadvantageous in view of manufacturing costs. Accordingly, the top coat clear paint layer is roll coated to have a thickness of 8~15 μm, and heated at a PMT of 190~240° C. Painting can be performed by conventional floor coating in addition to roll-coating.

Figure 3:
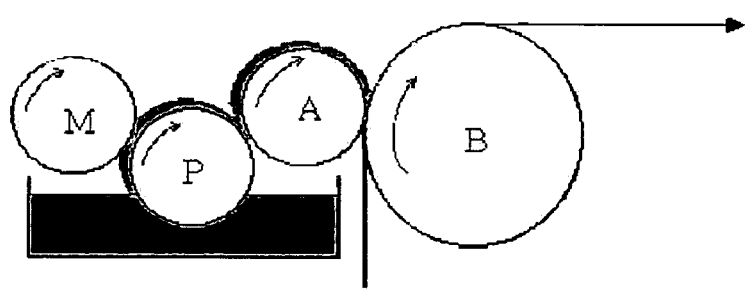
FIG. 3 is a schematic view illustrating a three-roll reverse type painting method.

Roll-coating is applied to manufacturing of the color steel sheet for the household appliances using a flat substrate, and is typically performed via a V-shaped 3-roll full reverse type method. However, according to this method, it is difficult to freely control the thickness of the painted film due to the properties of the embossed substrate. FIG. 3 schematically shows the 3-roll reverse type method.

In addition, when viewing a partial process in the step of coating the paints on the substrate by the conventional roll coating process, the paints are supplied to a predetermined height or more on a catch pan, and are picked up by virtue of rotational force of a pick-up roller (P/R). After being picked up, the paints are adjusted in thickness applied to the surface of the pick-up roller by rotating a metering roller (M/R) in a reverse direction, and an adjusted wet film of the paints is then transferred to a coating roller (C/R). Finally, the roll coating is performed in such a manner that the wet film of the paints is brought into contact with the substrate by rotating the C/R in a direction opposite an advancing direction of the substrate. However, since the catch pan always contains the paints at a predetermined amount or more, popping defects occur due to color separation, pigment deposition, and accumulation of bubbles.

In order to solve the problem as described above as much as possible, circulation type roll coating has been suggested in which the paints being currently used are discharged, and the paints are re-supplied after being circulated again. However, this method also does not solve the fundamental problems due to the properties of the embossed substrate.

Figure 4:
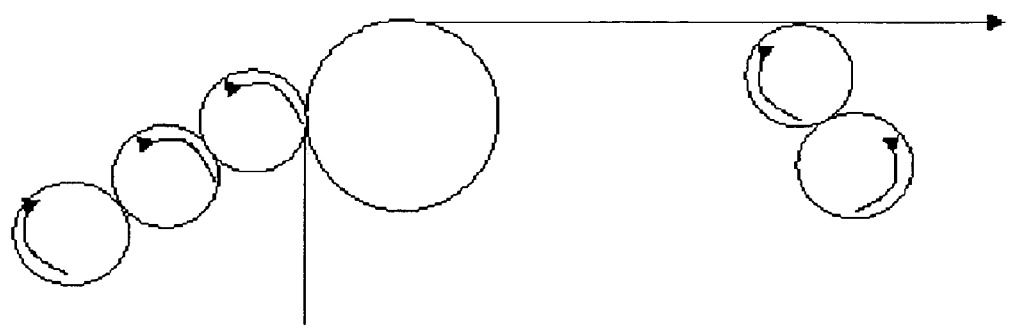
FIG. 4 is a schematic view illustrating a three-roll natural type painting method.
Figure 5:
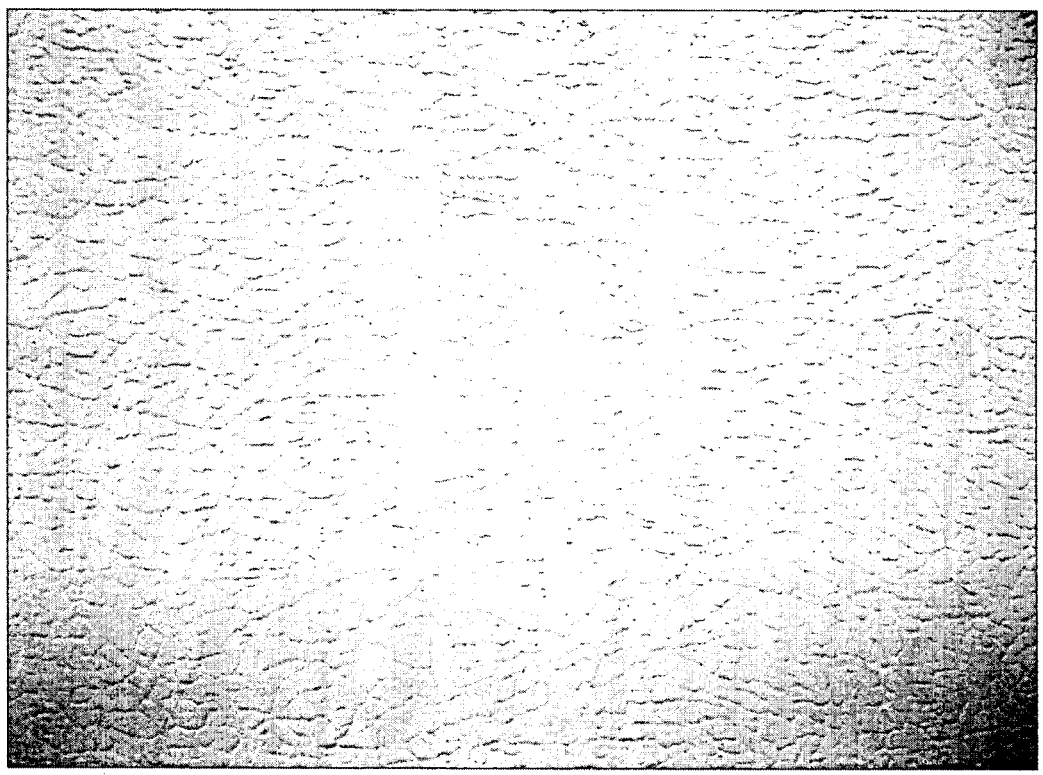
FIGS. 5, 6, 7 and 8 are micrographs showing the surfaces of single-side embossed color steel sheets of first, second and third examples of the present invention, and a comparative example, respectively.
Figure 6:
Figure 7:
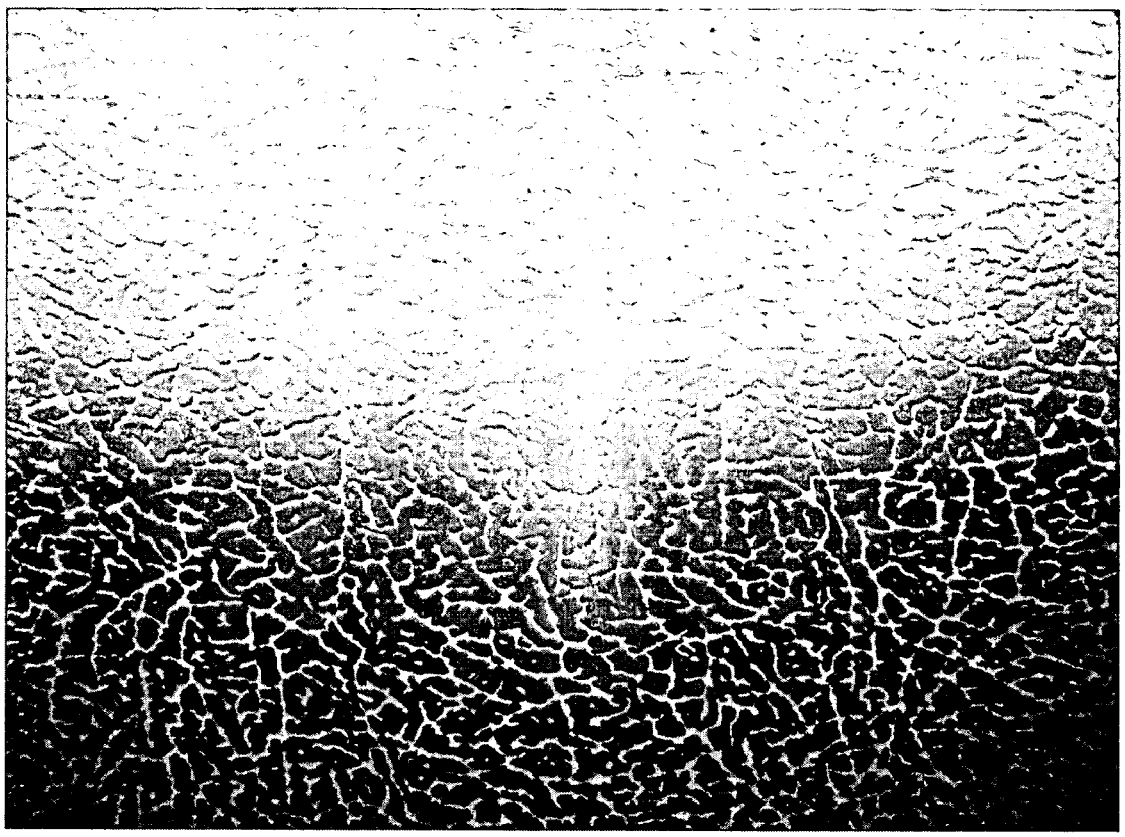
Figure 8:
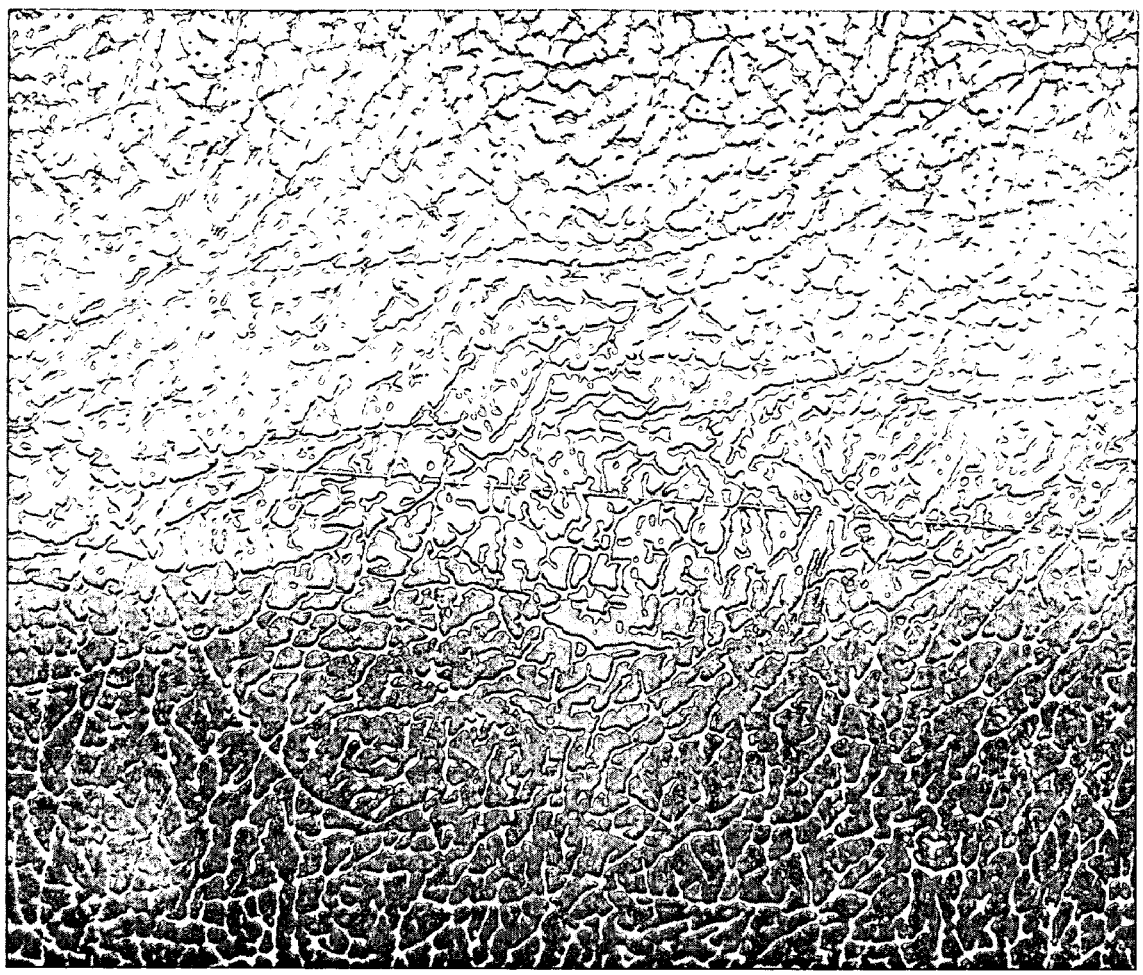

In order to solve the problems as described above while enhancing the build-up of the painted film, the present invention adopts a three-roll natural type coating in which the rollers rotate in a direction opposite the rollers of the 3-roll reverse type coating under the condition wherein the P/R, the M/R, and the C/R are disposed not in the conventional V-shaped disposition but in a linearly slanted disposition as shown in FIG. 4. Then, the steel sheet is painted by a top feed method in which fresh paints are directly supplied to a space between the M/R and the P/R while being circulated in a tank, so that the painted film has a sufficient feeling of texture.

The present invention has main characteristics in that it comprises the printing process on the one-side embossed color steel sheet. With this process, the paints having various feelings of texture and color are printed on protruded portions of the one-side embossed substrate, thereby making grooves of the embossed substrate even more distinctive. Such a printing operation can freely express two or more colors with the printing degree in the range of 1~4 according to the demand of the consumers, and can provide various designs using the mesh roller and the pattern roller, thereby providing aesthetic appearance having a further enhanced feeling of solidity together with the existing embossed pattern.

The method of the present invention can be applied to manufacture of a color steel sheet without having the primary coat in consideration of reduction in the number of processes and manufacturing costs as well as a 3C3B steel sheet on which a primary coat paint layer, a color base layer, and a clear paint layer are painted. In other words, the present invention can be realized by a 2C2B print method which comprises the steps of painting only a color base on a pretreated substrate, printing, and forming a top coat clear paint layer.

The present invention will be described with reference to inventive examples and a comparative example as follows. It should be noted that the present invention is not limited by these examples described below.

The size of samples and painting conditions for the examples are as follows, in which % refers to weight %.

Dimensions of coil: W 1040×T 0.5 mm EGI (electro-galvanized steel sheet)

Dried film thickness: primary coat paint layer 5 μm, base paint 15 μm, printed layer 3 μm, clear layer 10 μm Pretreatment agent: 203P (non-Cr type) available from Dae Han Parkerizing Viscosity of primary coat paint: 170 seconds (with reference to 25° C., #4 Ford cup)

Viscosity of base color paint: 140 seconds (with reference to 25° C., #4 Ford cup)

Viscosity of print ink: 100 seconds (with reference to 25° C., #4 Ford cup)

Viscosity of top coat clear paint: 100 seconds (with reference to 25° C., #4 Ford cup)

Roll coating type: natural reverse type

Table 3 shows results of tests for comparing inventive examples comprising the printing step of the invention with a comparative example which is the conventional one-side embossed color steel sheet.

TABLE 3

| Steps | Inventive Exam. 1 | Inventive Exam. 2 | Inventive Exam. 3 | Comparative Exam. |
|---|---|---|---|---|
| Pretreatment | non-Cr | non-Cr | non-Cr | chromate |
| Primary coat | — | non-toxic | non-toxic | toxic |
| Color base | ○ | ○ | ○ | — |
| Print | Mesh | pattern | mesh | — |
| Top coat clear | ○ | ○ | ○ | — |
| Top coat color | — | — | — | ○ |

Table 4 shows results of tests for comparing properties of a paint film of the inventive examples and the comparative example.

TABLE 4

| Properties | Inventive Exam. 1 | Inventive Exam. 2 | Inventive Exam. 3 | Comparative Exam. |
|---|---|---|---|---|
| 1. Brilliance (60 degrees) | 69 | 72 | 70 | 67 |
| 2. Gasket property | 0.9 | 1.0 | 0.8 | 0.8 |
| 3. Moisture resistance | ◎ | ◎ | ◎ | ◎ |

TABLE 4-continued

| Properties | | Inventive Exam. 1 | Inventive Exam. 2 | Inventive Exam. 3 | Comparative Exam. |
|---|---|---|---|---|---|
| 4. Solvent resistance | | 30 | 30 | 30 | 40 |
| 5. Workability | T-bending | 2T | 1T | 1T | 2T |
| | s-cupping | ○ | ◎ | ◎ | ○ |
| 6. Adherence | | ◎ | ◎ | ◎ | ◎ |
| 7. Impact | | ◎ | ◎ | ◎ | ◎ |
| 8. Chemical resistance | 5% NaOH | Δ | ○ | ○ | ◎ |
| | 5% HCl | ○ | ○ | ○ | ◎ |
| 9. Corrosion resistance | | Δ | ○ | ○ | ◎ |
| 10. UV resistance | | ◎ | ◎ | ◎ | ◎ |

◎: Very good,
○: Good,
Δ: Normal,
X: Poor

Brilliance was measured on the surface of the samples with a brilliance measurer under the condition of an illuminating angle of 60 degrees.

Gasket property was measured by ΔE under the condition of a temperature of 70° C. and wetting of 95% for 8 hours after attaching a gasket.

Moisture resistance was measured via observation of appearance under the condition of a temperature of 40° C. and wetting of 95% for 8 hours.

Solvent resistance was measured by MEK rubbing.

Workability was measured analyzing cracks after T-bending or square cupping.

Adherence was measured by means of a 6 mm cross-cut.

Impact was measured for samples of 1/2ϕ×1 kg×50 cm.

Chemical resistance was measured by comparing samples before testing with samples after immersing the samples into 5% NaOH solution and 5% HCl for 24 hours.

Resistance was measured via observation of appearance after salt spray testing at a temperature of 35° C. in 5% NaCl for 240 hours.

UV resistance was measured using samples of 20w×20 cm for 48 hours under the condition that ΔE is 1.5 or less.

In Table 4, it can be appreciated that the environmentally friendly single-side embossed color steel sheet having printability according to the invention exhibits a remarkable and distinctive feeling of solidity while enhancing the contaminant resistance and the workability as well as satisfactory fundamental properties of the steel sheets required for household appliances in terms of functionality of the steel sheet without using typical materials under environmental regulation which are normally used to provide excellent corrosion resistance.

As apparent from the above description, the single-side embossed color steel sheet having the printability according to the invention exhibits a feeling of solidity with the various feelings of texture and colors, thereby providing remarkably improved aesthetic appearance in comparison to the conventional color steel sheet which has a single color and a basic pattern. In addition, since the single-side embossed color steel sheet also has enhanced contaminant resistance properties and environmental friendliness, it satisfies purchasing requirements of the consumers having an emphasis on aesthetic design of the products as well as functionality, thereby creating new demands.

It should be understood that the embodiments and the accompanying drawings have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A color steel sheet with embossed patterns on one side, comprising: a steel sheet substrate; a zinc or zinc alloy-plated layer; a non-chromate or chromate pretreated layer; a primary coat paint layer comprising an oil-free polyester, polyisocyanate, epoxy, pigment, additives and solvents, the oil-free polyester having a number-average molecular weight of 15,000~25,000, a glass transition temperature (Tg) of 10~30° C. and an OH value of 5~20; a color base paint layer comprising a modified oil-free polyester compound, pigment, additives and solvents, the modified oil-free polyester compound being formed by reacting melamine with an oil-free polyester having a number-average molecular weight of 8,000~20,000, a glass transition temperature (Tg) of 20~45° C. and an OH value of 15~40; a printed layer; and a top coat clear paint layer.

2. The color steel sheet according to claim 1, wherein the pigment of the primary coat paint layer is a non-Cr and non-toxic rust resistant pigment.

3. The color steel sheet according to claim 1, wherein the paint of the top coat clear paint layer comprises a modified oil-free polyester compound, additives and solvents, the modified oil-free polyester compound being formed by reacting the melamine with a oil-free polyester having a number-average molecular weight of 8,000~20,000, a glass transition temperature (Tg) of 20~45° C. and an OH value of 15~40.

4. The color steel sheet according to claim 3, wherein the additives of the top coat clear paint layer comprise p-toluene sulfonic acid (PTSA) as a curing accelerator.

5. The color steel sheet according to claim 1, wherein the printed layer comprises pearl and metallic inks having a particle size of 60 μm or less.

* * * * *